United States Patent
Ma

(10) Patent No.: US 9,789,384 B1
(45) Date of Patent: Oct. 17, 2017

(54) SELF-BALANCING BOARD HAVING A SUSPENSION INTERFACE

(71) Applicant: Koofy Development Limited, West Avenue (CN)

(72) Inventor: Ondy Song Qi Ma, Hong Kong (CN)

(73) Assignee: KOOFY DEVELOPMENT LIMITED, Hong Kong (HK)

(*) Notice: Subject to any disclaimer, the term of this patent is extended or adjusted under 35 U.S.C. 154(b) by 0 days.

(21) Appl. No.: 15/652,137

(22) Filed: Jul. 17, 2017

Related U.S. Application Data

(63) Continuation of application No. 15/258,634, filed on Sep. 7, 2016, now Pat. No. 9,707,470.

(51) Int. Cl.
*A63C 17/12* (2006.01)
*B62K 1/00* (2006.01)
(Continued)

(52) U.S. Cl.
CPC .......... *A63C 17/12* (2013.01); *A63C 17/0046* (2013.01); *A63C 17/014* (2013.01);
(Continued)

(58) Field of Classification Search
CPC .............................. A63C 17/12; A63C 17/014
See application file for complete search history.

(56) References Cited

U.S. PATENT DOCUMENTS 6,302,230 B1  10/2001  Kamen et al.
7,424,927 B2  9/2008  Hiramatsu
(Continued)

FOREIGN PATENT DOCUMENTS

CA  2492393 A1  1/2004
CN  2673465 Y   1/2005
(Continued)

OTHER PUBLICATIONS

XenonJohn, 'Self balancing one wheeled electric skateboard' [online], Instructables, publication date unknown [retrieved Dec. 12, 2016], retrieved from Internet <URL: http://www.instructables.com/id/Self-balancing-one-wheeled-electric,-skateboard/>.
(Continued)

*Primary Examiner* — John Walters
*Assistant Examiner* — James Triggs
(74) *Attorney, Agent, or Firm* — Millman IP Inc.

(57) ABSTRACT

A self-balancing board is provided, comprising a platform having a first foot deck portion to substantially support a first foot of a rider, and a second foot deck portion to substantially support a second foot of the rider. A wheel assembly is positioned between the first foot deck portion and the second foot deck portion along a longitudinal axis of the platform, and comprises a wheel having a rotation axis that is generally orthogonal to the longitudinal axis of the platform, and a motor unit driving the wheel. An orientation sensor senses the orientation of the platform. A controller receives data from the orientation sensor and controls the motor unit in response to the received data. At least one suspension interface between the platform and the wheel assembly has a single degree of freedom generally orthogonal to the rotation axis of the wheel and to the longitudinal axis of the platform, and biases the platform towards a rest position.

19 Claims, 6 Drawing Sheets

(51) Int. Cl.
*A63C 17/08* (2006.01)
*A63C 17/00* (2006.01)
*A63C 17/01* (2006.01)
*B62K 11/00* (2006.01)
*G05D 1/08* (2006.01)

(52) U.S. Cl.
CPC .............. *A63C 17/08* (2013.01); *B62K 1/00* (2013.01); *B62K 11/007* (2016.11); *G05D 1/0891* (2013.01); *A63C 2203/12* (2013.01); *A63C 2203/24* (2013.01); *A63C 2203/42* (2013.01); *B62K 2202/00* (2013.01)

(56) References Cited

U.S. PATENT DOCUMENTS

| | | | |
|---|---|---|---|
| 7,467,681 | B2 | 12/2008 | Hiramatsu |
| 7,811,217 | B2 * | 10/2010 | Odien .............. A63B 21/0058 482/147 |
| 8,738,278 | B2 | 5/2014 | Chen |
| 9,101,817 | B2 | 8/2015 | Doerksen |
| 2007/0254789 | A1 | 11/2007 | Odien |
| 2008/0242515 | A1 | 10/2008 | Odien |
| 2011/0220427 | A1 | 9/2011 | Chen |
| 2014/0326525 | A1 | 11/2014 | Doerksen |
| 2015/0323935 | A1 | 11/2015 | Doerksen |

FOREIGN PATENT DOCUMENTS

| | | |
|---|---|---|
| CN | 102179039 A | 9/2011 |
| CN | 202179842 U | 4/2012 |
| CN | 202740750 U | 2/2013 |
| CN | 103191558 A | 7/2013 |
| CN | 203232269 U | 10/2013 |
| CN | 203244742 U | 10/2013 |
| CN | 203244743 U | 10/2013 |
| CN | 203581249 U | 5/2014 |
| CN | 103950503 A | 7/2014 |
| CN | 203921066 U | 11/2014 |
| CN | 204017335 U | 12/2014 |
| CN | 204250249 U | 4/2015 |
| CN | 204473001 U | 7/2015 |
| CN | 204713295 U | 10/2015 |
| WO | 0142077 A2 | 6/2001 |
| WO | 2005016735 A1 | 2/2005 |
| WO | 2014182527 A1 | 11/2014 |

OTHER PUBLICATIONS

Future Motion, 'Onewheel :: The Self-Balancing Electric Skateboard' [online], Kickstarter, project launched Jan. 6, 2014 [retrieved Dec. 12, 2016], retrieved from Internet: <URL: https://www.kickstarter.com/projects/4422853/onewheel-the-self-balancing-electric-skateboard>.

The Flying Nimbus Is an Electric One Wheel Skateboard That Balances Itself [online], Wonderful Engineering, Nov. 22, 2014, retrieved from Internet <URL: http://wonderfulengineering.com/the-flying-nimbus-is-an-electric-one-wheel-skateboard-that-balances-itself/>.

Dingley, John, 'One Wheeled Motorbike, One Wheeled Skateboard, Two Wheeled Skateboard, all Self-Balancing' [online], publication date unknown [retrieved on Jun. 28, 2016], retrieved from the Internet: <URL: https://sites.google.com/site/onewheeledselfbalancing/>.

The ZBoard Electric Skateboard Store [online], ZBoard, publication date unknown [retrieved on Jun. 28, 2016], retrieved from the Internet: <URL: http://www.zboardshop.com/>.

iCarbot—Newest Patent 4 Wheel Electric Scooter, Powered Walk Car [online], Shenzhen Counterbalance Technology Co., Ltd & Zhengzhou F-wheel Industrial Co., Ltd, 2012-2015 [retrieved on Jun. 28, 2016], retrieved from the Internet: <URL: http://www.fwheel.cc/Product-Self-Balancing-Electric-Unicycle/iCarbot-walkcar-four-wheel-scooter.html>.

Motion Controller [online], Wikimedia Foundation, Jun. 26, 2016 [retrieved Jun. 28, 2016], retrieved from the Internet: <URL: https://en.wikipedia.org/wiki/Motion_controller>.

Boosted —The Ultimate Electric Skateboard [online], Boosted Boards, 2016 [retrieved Jun. 28, 2016], retrieved from the Internet: <URL: https://boostedboards.com/>.

Kelion, Leo, 'CES 2016: Hoverboard booth raided following patent complaint' [online], BBC News, The British Broadcasting Corporation, Jan. 8, 2016 [retrieved Jun. 28, 2016], retrieved from the Internet: <URL: http://www.bbc.com/news/technology-35259579>.

PCT/IB2016/056630, International Search Report & Written Opinion, Feb. 8, 2017, State Intellectual Property Office of be People's Republic of China.

* cited by examiner

SELF-BALANCING BOARD HAVING A SUSPENSION INTERFACE

CROSS-REFERENCE TO RELATED APPLICATIONS

This application is a continuation of application Ser. No. 15/258,634, filed Sep. 7, 2016, which is the National Stage of International Application No. PCT/IB2015/058495, filed Nov. 3, 2015, the contents of which are incorporated herein in their entirety.

FIELD OF THE DISCLOSURE

This invention relates to transportation vehicles for individuals, particularly a self-balancing board having a suspension interface.

BACKGROUND

Self-balancing vehicles for transportation of individuals are known in the art. As described in U.S. Pat. No. 6,302,230 B1 and AT299826 (Kamen), typically such vehicles are equipped with two concentric individually driven wheels, spaced apart and with a platform between, onto which the rider of the vehicle may stand facing in the intended fore/aft direction of motion. Gyroscopic and accelerometer sensors detect changes in orientation and motion of the platform and feed information to a motor control system which is programmed to maintain platform orientation horizontal within a certain range by rotating the wheels in any direction, having the effect of aligning the centers-of-gravity of the vehicle and the rider whilst the vehicle is in constant motion. On some types there is an upright handlebar connected to the platform, giving the rider ability to further control the vehicle by leaning sideways, whereby the wheels will rotate at different speeds and/or direction, causing the vehicle to turn.

Another variant of the above described self-balancing is taught by U.S. Pat. No. 8,738,278 B2 (Chen) in which a vehicle has two spaced individually powered wheels, controlled by a motor control system, with a platform between which is split laterally in two halves. Each half of the platform is associated to one wheel, sensors and motor, and corresponds to the position of left and right feet of the rider of the vehicle, whereby the rider can control the relative speed and rotation direction of the two wheels using their feet to tilt the two platform sections relative to each other. One benefit of this type of self-balancing vehicle is the lack of need for an upright handlebar, making the unit smaller and maneuverable without using the hands.

A third type of self-balancing vehicle is based on a single wheel. US2011220427A1 (Chen) discloses a self-balanced vehicle with a large wheel and footrests on either side of the wheel. Friction pads extending upwards from each foot rest are designed to give the rider more stability and comfort by providing support to the inside of the rider's calves.

CN 203581249 and CN 203581250 disclose another type of two wheeled device similar to that disclosed in U.S. Pat. No. 6,302,230, wherein a platform upon which a rider is supported has two wheels located at lateral sides thereof. The rider stands with their center of gravity atop of the platform and does not generally lean laterally. Each of the two wheels is independently suspended to provide the user a more comfortable ride. Upon encountering a typical irregularity in a travel surface, the rider's weight may shift forward or backward suddenly, causing the rider to shift their weight to their toes or their heels, respectively. The vehicle can compensate by accelerating or decelerating to position the vehicle under the rider's center of gravity.

CN 203921066 and CN 204250249 disclose a one-wheeled vehicle wherein a user straddles a wheel and places their feet on foot rests on either side of the wheel. A rider may lean slightly forward or backward to accelerate or decelerate the one-wheeled vehicle. Further, the rider may lean slightly left or right to cause the vehicle to turn as it is moving. In both cases, though, the rider's center of gravity rests generally above the wheel. A suspension couples the foot rests to the wheel and provide a more comfortable ride. Like the vehicle disclosed in CN 203581249, upon encountering a typical irregularity in a travel surface, the rider's weight may shift forward or backward suddenly, causing the rider to shift their weight to their toes or their heels, respectively. The vehicle can compensate by accelerating or decelerating to position the vehicle under the rider's center of gravity.

SUMMARY

According to one non-limiting aspect, there is provided a self-balancing board for lateral transportation of individuals, comprising:

a motor unit with an extending drive shaft, defining a reference z-axis and an x-y plane normal to the z-axis;

a power unit coupled to the motor unit to supply power thereto;

a wheel having a rotation axis and adapted to receive the motor unit with the rotation axis and the z-axis aligned concentrically;

an elongated board unit, predominantly having a cuboid shape, its sides extending along respective symmetry axes defining reference axes x, y and z and an imaginary board center-point of gravity, defining an x-z plane and a normal axis y, having a recess adapted to receive the wheel symmetrically and with concentric z-axes, the drive shaft fixed in both ends by bushing means on the board unit, and the board enabling a rider to stand on along the x-z plane straddling the wheel, the rider's feet being oriented predominantly along the x direction;

movement sensors attached to the board unit; and a control unit adapted to read data from the movement sensors and selectively control the power supplied to the motor unit in order to maintain vertical alignment between the centers-of-gravity of the board unit and rider, wherein there is at least one suspension interface between the board unit and drive shaft of the motor unit, the at least one suspension interface having a single degree of freedom generally normal to the x-z plane of the elongated board unit.

Each of the at least one suspension interface can comprise a pneumatic damper.

Each of the at least one suspension interface can comprise a hydraulic damper.

Each of the at least one suspension interface can comprise a dry-friction damper.

Each of the at least one suspension interface can comprise a damper made of a resilient material, such as rubber or foam.

According to another non-limiting aspect, there is provided a self-balancing board for lateral transportation of individuals, comprising:

a motor unit with an extending drive shaft defining a z-axis;

a power unit coupled to the motor unit to supply power thereto;

a wheel having a rotation axis and adapted to receive the motor unit with the rotation axis and the z-axis aligned concentrically;

an elongated board unit comprising a first foot deck portion to substantially support a first foot of a rider, and a second foot deck portion to substantially support a second foot of the rider, the board unit being adapted to receive the wheel between the first foot deck portion and the second foot deck portion along a longitudinal axis of the board unit that is generally orthogonal to the rotation axis of the wheel, the drive shaft fixed at both ends by bushing means on the board unit;

a gyroscopic sensor attached to the board unit;

a control unit, adapted to read data from the gyroscopic sensor and selectively control the supply of power to the motor unit in order to maintain vertical alignment between the centers-of-gravity of board and rider; and at least one suspension interface between the board unit and the drive shaft of the motor unit, and having a single degree of freedom generally orthogonal to the rotation axis of the wheel and to the longitudinal axis of the elongated board.

According to a further non-limiting aspect, there is provided a self-balancing board, comprising:

a platform comprising a first foot deck portion to substantially support a first foot of a rider, and a second foot deck portion to substantially support a second foot of the rider;

a wheel assembly positioned between the first foot deck portion and the second foot deck portion along a longitudinal axis of the platform, the wheel assembly comprising:

a wheel having a rotation axis that is generally orthogonal to the longitudinal axis of the platform; and a motor unit driving the wheel;

an orientation sensor sensing the orientation of the platform;

a controller receiving data from the orientation sensor and controlling the motor unit in response to the received data; and at least one suspension interface between the platform and the wheel assembly and having a single degree of freedom generally orthogonal to the rotation axis of the wheel and to the longitudinal axis of the platform, and biasing the platform towards a rest position.

Each of the at least one suspension interface can comprise a spring.

The spring can comprise a helical metal coil.

The spring can comprise a leaf spring.

The spring can comprise a resilient element.

Each of the at least one suspension interface can further comprise a damper.

The damper can comprise a pneumatic damper.

The damper can comprise a hydraulic damper.

The damper can comprise a dry-friction damper.

The damper can be comprised of a resilient material, such as a rubber or a foam.

The wheel assembly can further comprise an axle extending through the motor unit, and wherein each of the at least one suspension interface can be coupled to the axle.

The at least one suspension interface can comprise an elongated slot that is orthogonal to the rotation axis of the wheel and to the longitudinal axis of the platform.

A feature of at least one of the wheel assembly and the at least one suspension interface can prevent tilting of the platform relative to the wheel assembly.

The feature can comprise a bushing secured to the wheel assembly that is dimensioned to be snugly received and restricted from rotating within the elongated slot.

The feature can comprise a cross-section of the axle that is dimensioned to be snugly received and restricted from rotating within the elongated slot.

The self-balancing board can further comprise at least two of the suspension interfaces, the elongated slots of the at least two suspension interfaces having a fixed width therebetween.

The self-balancing board can further comprise an accelerometer coupled to the controller, wherein the controller receives motion data from the accelerometer and controls the motor unit in response to the received motion data.

The wheel can comprise a tire having a generally flat central tread region and tapering towards its lateral sides.

According to still yet another non-limited aspect, there is provided a self-balancing board, comprising:

a platform comprising a first foot deck portion to substantially support a first foot of a rider, and a second foot deck portion to substantially support a second foot of the rider;

a wheel assembly positioned between the first foot deck portion and the second foot deck portion along a longitudinal axis of the platform, the wheel assembly comprising:

a wheel having a rotation axis that is generally orthogonal to the longitudinal axis of the platform; and a motor unit driving the wheel;

an orientation sensor sensing the orientation of the platform;

a controller receiving data from the orientation sensor and controlling the motor unit in response to the received data; and at least one suspension interface between the platform and the wheel assembly and preventing rotation and lateral and longitudinal movement of the platform relative to the wheel assembly, the at least one suspension interface biasing the platform towards a rest position.

BRIEF DESCRIPTION OF THE DRAWINGS

Embodiments will now be described, by way of example only, with reference to the attached Figures, wherein.

DETAILED DESCRIPTION

Figure 1:
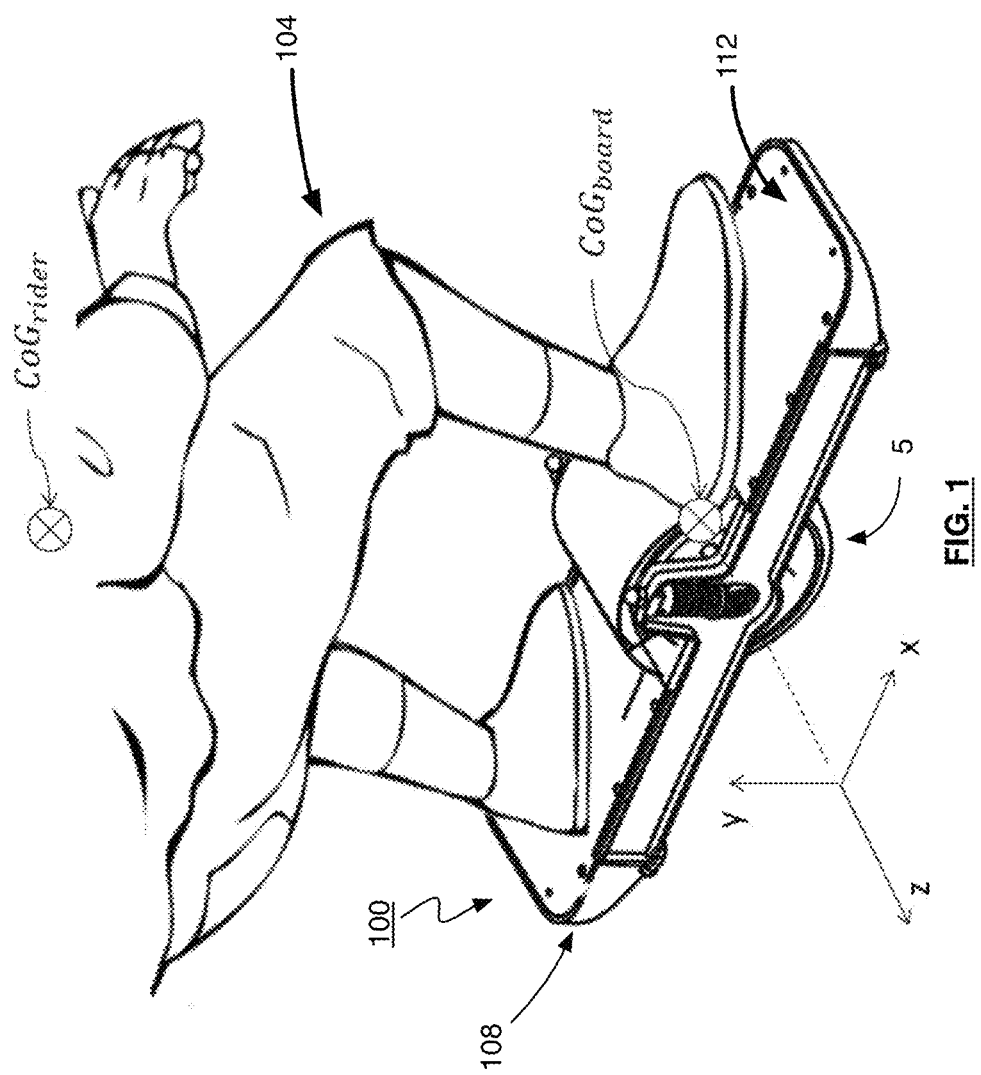
FIG. 1 is a side perspective view with a rider positioned atop of a self-balancing board in accordance with a non-limiting embodiment.

FIG. 1 shows the self-balancing board 100 according to a first non-limiting embodiment in use by a rider 104. The self-balancing board 100 has a platform 108 that is an elongated board unit having a top surface defining a foot deck 112 upon which the rider 104 is standing on. The top surface of the platform 108 is generally referred to as the x-z plane of the platform 108. The rider 104 is shown straddling a centrally and symmetrically positioned wheel assembly 5 to which the platform 108 is rotatably coupled with his or her feet, aiming to travel generally along the x-axis, either to their left or their right. Both the self-balancing board 100 and the rider 104 have a center-of-gravity, marked CoG board and CoG_rider respectively. The CoG_board is always approximately coincident with the rotation axis of the wheel assembly 5, a control unit of the self-balancing board 100 is able to control a motor within the wheel assembly 5 to drive a wheel and thus the self-balancing board 100 forwards or backwards in order to maintain vertical alignment of the two CoGs. Thus, the rider 104 is able to lean left or right along the x direction, thereby changing the alignment of the CoGs and the orientation of the platform 108, causing one end of the platform 108 to pivot towards a surface upon which the self-balancing board 100 is positioned, and the other end of the platform 108 to pivot away from the surface.

Figure 2:
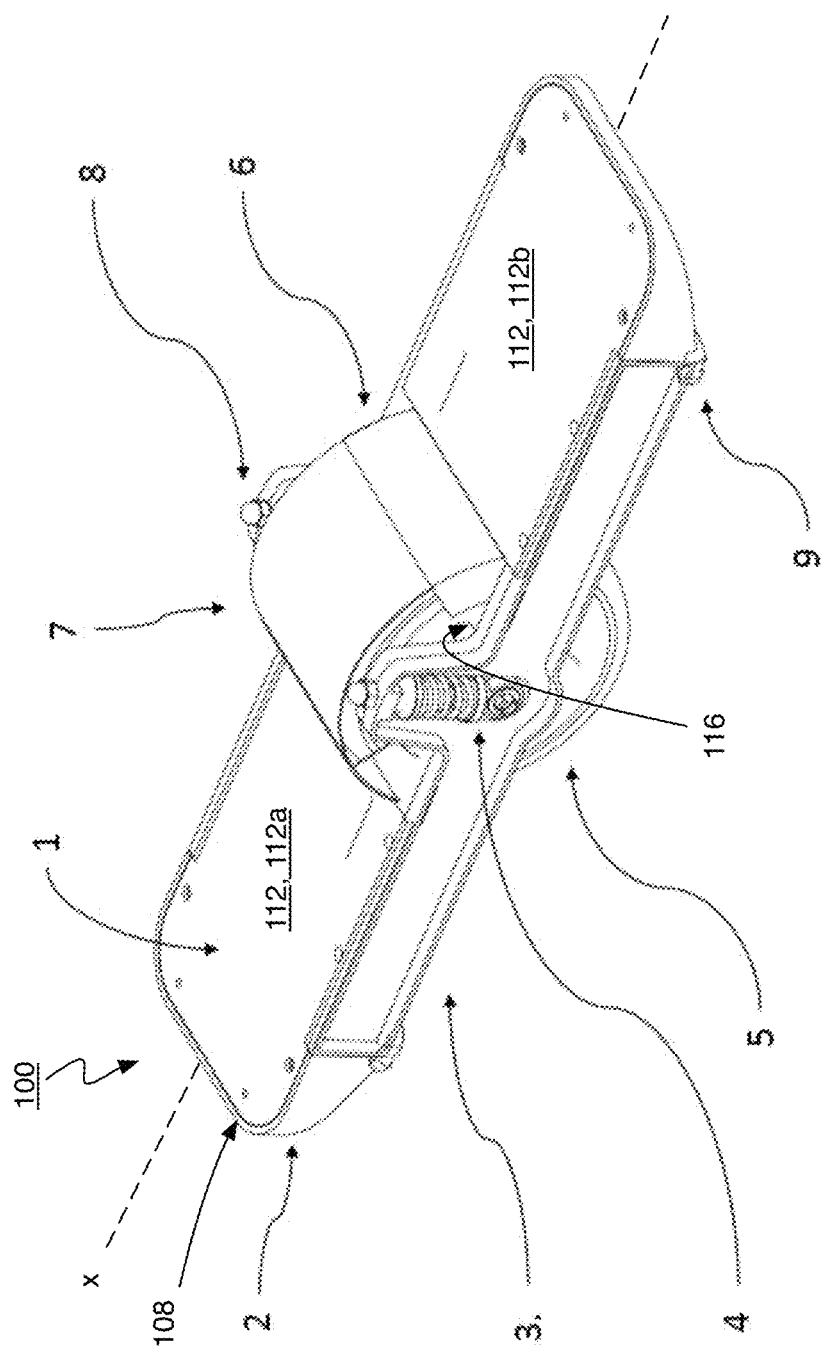
FIG. 2 is a side perspective view of the self-balancing board of FIG. 1.
Figure 3:
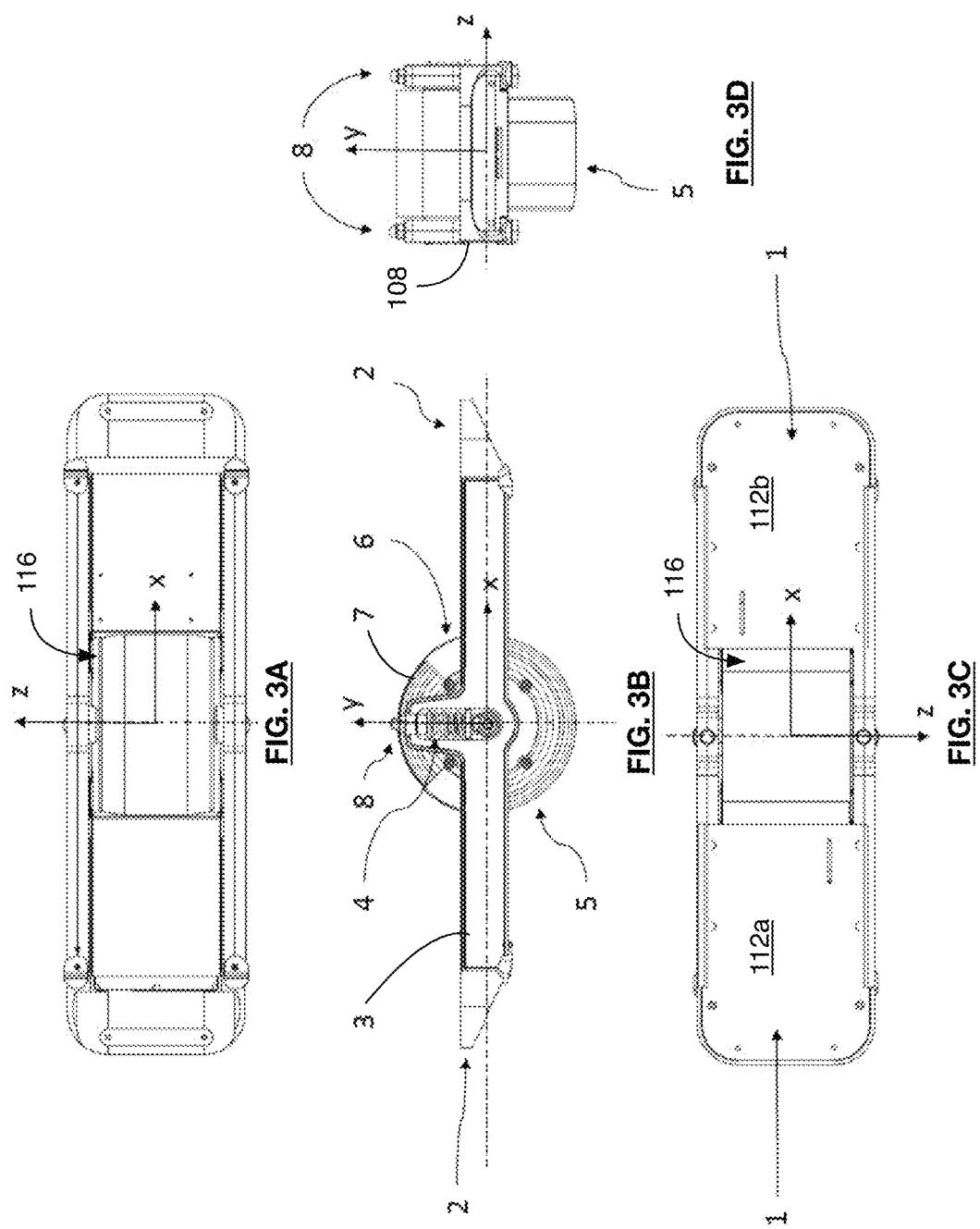
FIG. 3A shows a top plan view of the self-balancing board of FIG. 1.
FIG. 3B shows a side plan view of the self-balancing board of FIG. 1.
FIG. 3C shows a bottom plan view of the self-balancing board of FIG. 1.
FIG. 3D shows a rear plan view of the self-balancing board of FIG. 1.
Figure 4:
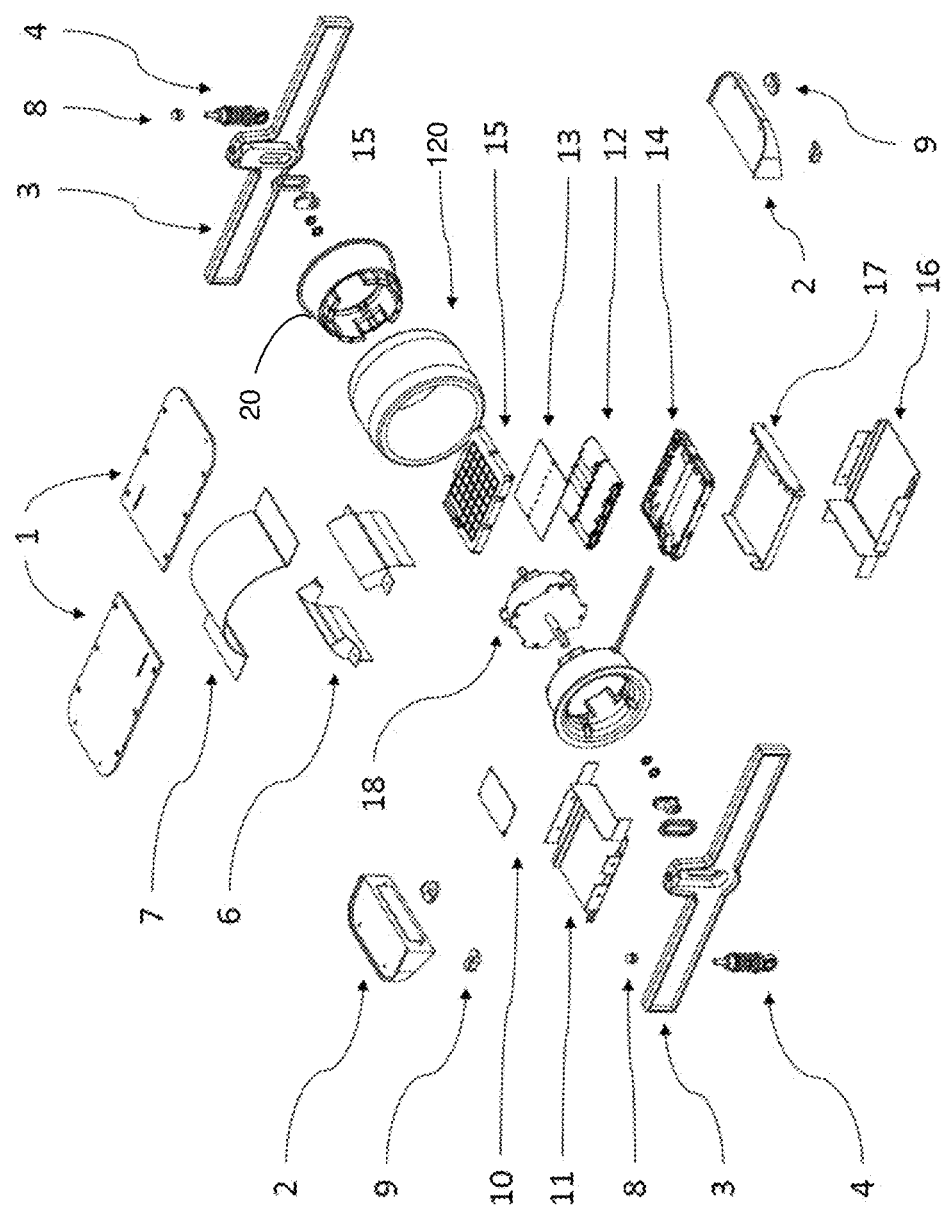
FIG. 4 is an exploded view of the self-balancing board of FIG. 1, including a wheel assembly and a pair of suspension interfaces.
Figure 5:
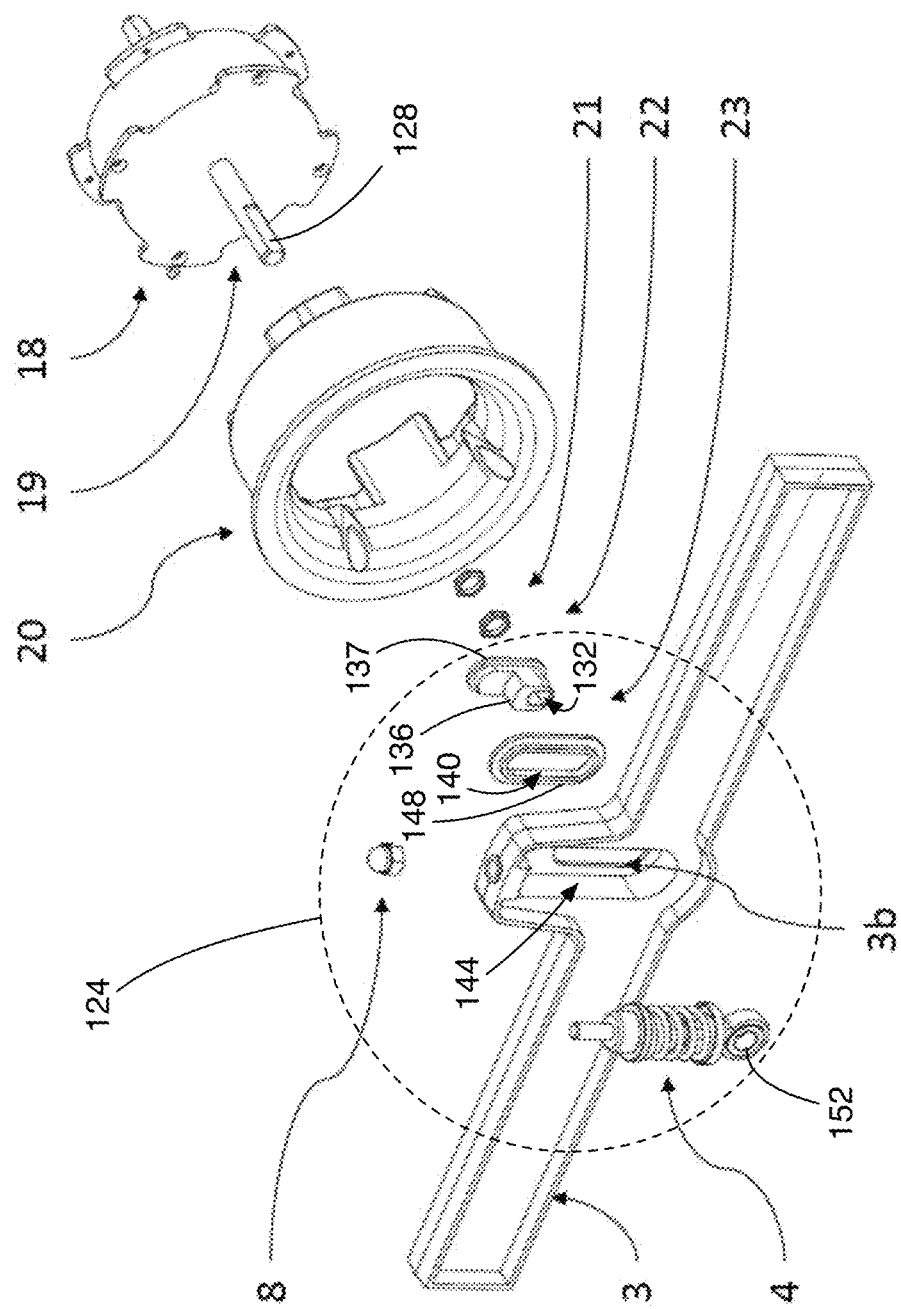
FIG. 5 is an exploded view of one of the suspension interfaces and a portion of the wheel assembly of FIG. 4.

FIG. 2 shows the general design of the self-balancing board 100. The platform 108 is generally elongated along the longitudinal axis (i.e. the x-axis) and has a generally central wheel opening 116 or recess in which the wheel assembly 5 is secured. The platform 108 has two side frame members 3 bridged and secured by a cover plate 1 on both sides of the central wheel opening 116. The cover plates 1 secure two end caps 2 at the longitudinal ends of the side frame members 3. Together, the side frame members 3 and the end caps 2 define a boxed frame structure that is cuboid in shape. The top surface of the cover plates 1 are generally parallel and define foot deck portions 112a, 112b that substantially support the feet, respectively, of the rider 104. The foot deck 112 refers generally to the plane on which the feet of the rider 104 are positioned. In some embodiments, the surfaces of the platform upon which the rider's feet rest may not be parallel relative to each other, or with a foot deck defined by the surfaces.

Fenders 6 are provided to prevent the rider's feet from touching the wheel assembly 5 and a wheel cover 7 further limits exposure to the wheel assembly 5 from a top side of the platform 108.

FIGS. 3A to 3D show the top, side, bottom, and rear plan views of the self-balancing board 100 of FIG. 1 and the reference coordinate system.

As shown in FIGS. 2 and 3A to 3D, the wheel assembly 5 is positioned within the central wheel opening 116 defined by the side frame members 3 and the cover plates 1 of the platform 108. As can be seen particularly with reference to FIGS. 3A to 3C, the wheel assembly 5 is positioned between the foot deck portions 112a, 112b along a longitudinal axis of the platform, denoted by the marked x-axis. Further, the rotational axis of the wheel assembly 5, and the wheel thereof, is denoted as the z-axis and is generally orthogonal to the longitudinal axis of the platform, the x-axis.

As can be seen particularly with reference to FIG. 3D, the tire 120 has a central flat tread region about its circumference and tapers towards its lateral sides. As can be understood, the contact area between the tire 120 and a travel surface is largest when the rotation axis of the tire 120 is generally parallel to the travel surface, and reduces in size when the tire 120 is tilted laterally. The wheel assembly 5 is shown in a rest position relative to the platform 108.

Now referring to FIGS. 3A to 5, the various components of the self-balancing board 100 are shown. In particular, the wheel assembly 5 is shown having a motor unit 18 to which a wheel is secured. The wheel includes two wheel rim sections 20 secured to the motor unit 18, and a tire 120 securely fit over the outer circumference of the wheel rim sections 20. The motor unit 18 drives rotation of the wheel rim sections 20 and the tire 120 about a drive shaft 19 that extends through the motor unit 18. The drive shaft 19 is connected to each side frame member 3 of the platform 108 via a suspension interface 124.

The suspension interfaces 124 cooperatively control the motion of the platform 108 relative to the wheel assembly 5, in this case via the drive shaft 19, providing a single degree of freedom and biasing the platform 108 towards a rest position relative to the wheel assembly 5.

In this particular embodiment, the suspension interface 124 includes a shock absorber 4, and thus the suspension interface 124 may in this example also be referred to as a shock absorber interface. Each of the shock absorbers 4 is connected to the drive shaft 19 at one end and to one of the side frame members 3 at the other end, and secured thereto with a shock absorber nut 8.

The drive shaft 19 has a generally round cross-section, with two flat sections at each end of the drive shaft 19 providing the drive shaft 19 with a non-circular cross-section having a so-called 'double D' shape. Two motor shaft nuts 21 are threaded onto each end of the drive shaft 19, and then each end of the drive shaft 19 is inserted through a drive slider 22 of the suspension interface 124. The motor shaft nuts 21 are spaced apart to snugly fit between the suspension interfaces 124, and prevent lateral movement of the drive shaft 19. Each drive slider 22 has a through-hole 132 having the same general cross-section as the ends of the drive shaft 19 so that the drive shaft 19 is tightly received and not able to rotate relative to the drive sliders 22. The drive sliders 22 have an elongated projection 136 along the longer dimension of the through-hole 132 and have two parallel flat surfaces on the outer profile of the elongated projection 136. Each of two slider bushings 23 of the suspension interface 124 has an elongated slot 140 that slidingly receives the elongated projection 136 of the drive slider 22 to permit movement therein orthogonal to the longitudinal axis x of the platform 108 and the rotation axis z of the wheel. The elongated slot 140 has parallel flat sides that correspond to the parallel flat surfaces of the elongated projection 136 of the drive slider 22 to inhibit rotation of the drive slider 22 relative to the slider bushing 23. The drive sliders 22 also include a peripheral flange 137 that abuts against the slider bushings 23.

Each side frame member 3 has a recess 144 in which one of the shock absorbers 4 is secured via one of the shock absorber nuts 8. An opening 3b is aligned longitudinally with the shock absorber 4 in the recess 144 of each of the side frame members 3. Each slider bushing 23 has a flange 148 extending around the elongated slot that fits snugly within the opening 3b of one of the side frame members 3 to control travel of the drive slider 22, and thus the drive shaft 19, relative to the side frame member 3. An end of the drive shaft 19 is slidingly fit through the drive slider 22, which is in turn fit into the elongated slot 140 of the slider bushing 23, and extends through a lower end bushing 152 of the shock absorber 4.

The slider bushing 23 provides one degree of freedom to the drive slider 22, allowing the drive slider 22 and wheel assembly 5 vertical movement along the y-axis generally orthogonal to the platform 108 and the rotation axis z of the wheel, and prevents movement of the wheel assembly 5 laterally along the rotation axis z of the wheel and the longitudinal x-axis of the platform 108 that are both orthogonal to the y-axis, as defined in FIGS. 3A to 3C. The drive slider 22 prevents rotational movement of the wheel assembly 5 as a whole relative to the platform 108. In particular, the 'double D' flats cut in to both ends of the drive shafts 19 and the drive sliders 22 prevent tilting of the platform 108 about the rotation axis z of the wheel relative to the wheel assembly 5, thus enabling the transmission of torque from the drive shaft 19 to the side frame members 3 via the slider bushings 23. Further, the fixed length of the drive shaft 19 between the suspension interfaces 124 and the abutment of the peripheral flange 137 of the drive slider 22 with the slider bushing 23 prevent lateral tilting, of the platform 108 relative to the wheel assembly 5. The drive slider 22 is used to reduce wear between the drive shaft 19 and the slider bushing 23 and to prevent fore-aft tilting of the platform 108 relative to the wheel assembly 5, but the drive shaft and the slider bushing can be configured in other embodiments to cooperatively work to provide the same functionality, such as by sizing the width of the cross-section of the drive shaft to fit snugly in the slider bushing and using larger motor shaft nuts.

The shock absorber 4 may be a so-called coil-over type which is readily available in the automotive and motorcycle parts market. This type of shock absorber has two components: a) a spring, a metal helical coil spring in particular, to provide load bearing capability to suspend the platform 108 relative to the wheel assembly 5, and b) a damper in the form of a pneumatic or hydraulic cylinder for absorbing the force from sudden vertical movements. The spring biases the platform 108 towards a rest position relative to the wheel assembly 5, which is the position of the platform 108 relative to the wheel assembly 5 when the self-balancing board 100 is placed atop of a flat surface without any weight positioned atop of it.

During operation, a rider places their feet atop of the foot deck portions 112A, 112B straddling the wheel assembly 5.

During a shock impact experienced when the self-balancing board 100 is traveling over a surface and encounters a surface irregularity or object, such as a speed bump or garden hose, the wheel assembly 5 is rapidly urged upwards. In order to prevent this shock impact from being directly transferred to the platform 108 and thus to a rider, the suspension interfaces 124 allow the wheel assembly 5 to move towards the platform 108 while exerting a biasing force to urge the platform 108 towards the rest position. The dampers act to absorb the energy of movement of the wheel assembly 5 relative to the platform 108, thus reducing the jarring effect transferred to the platform 108. Upon absorption of the energy of the wheel assembly 5 during the shock impact, the force of the suspension interfaces 124 biases the platform 108 towards the rest position relative to the wheel assembly 5, causing the platform 108 and the wheel assembly 5 to be pushed apart.

In this embodiment, the over-coil shock absorbers 4 are allowed one degree of freedom, along the y-axis, governed by the interaction between the drive sliders 22 and the slider bushings 23. It is assumed throughout this description that provision of a shock absorber interface is given on both sides of the board, in a symmetrical manner. It is of course also possible to envisage a suspension interface only on a single side, while continuing to permit only one degree of movement of the platform 108 and the wheel assembly (i.e., along the y-axis).

A battery tray 16 and a PCB tray 11 complete the box structure of the platform 108 by sealing off the structure defined by the side frame members 3, the end caps 2, and the cover plates 1. Located in the PCB tray 11 is a PCB 10 that includes a control circuit acting as a control unit, an orientation sensor and motion sensors in the form of a gyroscopic sensor and accelerometers. The gyroscopic sensor and accelerometers enable the control unit to determine motion and orientation of the self-balancing board 100. Located in the battery tray 16 is a removable power pack, defined by a battery pack 12, a battery PCB 13, a battery box 14, a battery cover 15 and a battery drawer 17. The removable power pack acts as a power unit for the motor unit 18. The motor unit 18 is housed by the wheel rim sections 20. In other embodiments, the wheel rim may be made integrally or from a three or more sections. The tire 120 and the motor 18 are fitted to a first of the wheel rim sections 20 before a second of the wheel rim sections 20 is secured to the first by four screws (not shown).

The self-balancing board 100 enables a rider to lean into curves.

Figure 6:
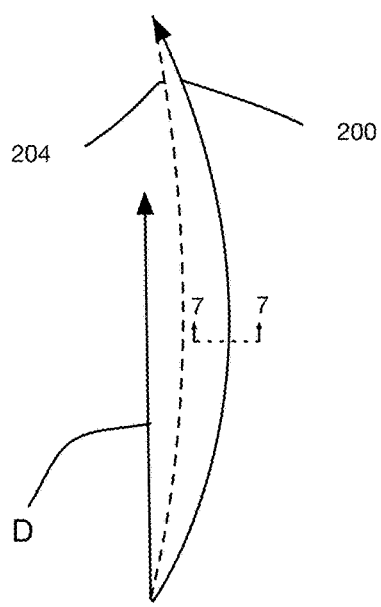
FIG. 6 illustrates a top view of a travel path of the self-balancing board of FIGS. 1 to 5.

FIG. 6 shows an exemplary travel path 200 of the self-balancing board 100, as well as the center of gravity 204 of a rider atop the self-balancing board 100, as the rider is going through a curve. As shown, the travel path 200 swings right and then back to an intermediate position.

Figure 7:
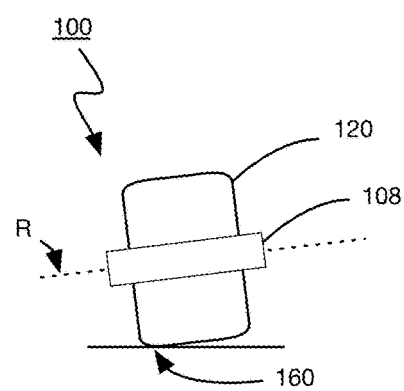
FIG. 7 shows a lateral orientation of the self-balancing board of FIGS. 1 to 5 at line 7-7 in FIG. 6.

FIG. 7 shows the lateral orientation of the self-balancing board 100 at line 7-7 in FIG. 6. At this point along the travel path 200, the self-balancing board 100 is to the right of the center of gravity 204 of the rider. That is, the rider's weight is shifted to the left side of the platform 108. As a result, the platform 108 is laterally tilted. The suspension interfaces 124, as they only provide a single degree of freedom, enable the rider to remain generally in control of both the fore-aft tilt of the platform 108 to control its speed, and of its lateral tilt to control its turning. The suspension interface 124 prevents the platform 108 from tilting relative to the drive shaft 19 and the wheel assembly 5, thus allowing the rider to control the portion of the tire 120 that is in contact with the travel surface. As the rider's center of gravity is not over the platform 108 and, in fact, is to the left of the platform 108, the rider's feet are pushing the self-balancing board 100 to the right. In turn, the tire 120 of the self-balancing board 100 exerts a friction force to the right against the travel surface, and the travel surface exerts an equal force in the opposite direction. When the rider's center of gravity is not over the platform 108, a loss of contact with the travel surface as a result of encountering a surface irregularity, such as a bump or a depression, could cause the self-balancing board 100 to be pushed laterally away by the feet of the rider, causing the rider to fall to the ground. The suspension interface 128 reduces the probability that the tire 120 will lose contact with the travel surface as a result of any surface irregularities by urging the tire towards the travel surface, all while not impacting the ability of the rider to control turning.

It will be obvious to a person skilled in the art that a function of shock absorption could be achieved via different types of shock absorber interfaces between the wheel assembly and the platform, as long as sufficient load bearing and shock absorbing properties are achieved.

According to yet another embodiment, the function of load bearing can be separated from the function of shock absorbing. Thus, there could on one hand be a load bearing function provided by a coil spring, a leaf spring or a spring made from a resilient material, and on the other hand be a damper with a shock absorbing property function provided by a pneumatic or hydraulic cylinder, or the single or twin cylinder types, or generally by using friction generated by principles of dry solid friction, fluid viscous friction or fluid dynamic friction.

While the wheel assembly is shown having a single wheel, it will be appreciated that the wheel assembly can alternatively have two or more wheels that act as and are considered to be a single wheel.

The wheel assembly can be coupled to the suspension interface in various manners. For example, the drive shaft can be terminated at each end with various structures, such as balls, plates, etc. that can be coupled to a suspension interface.

The above-described embodiments are intended to be examples of the present invention and alterations and modifications may be effected thereto, by those of skill in the art, without departing from the scope of the invention that is defined solely by the claims appended hereto.

What is claimed is:

1. A self-balancing board for lateral transportation of individuals, comprising:
   a motor unit with an extending drive shaft defining a z-axis;
   a power unit coupled to the motor unit to supplying power thereto;
   a wheel assembly having a wheel with a rotation axis and adapted to receive the motor unit with the rotation axis and the z-axis aligned concentrically;
   at least two foot deck portions comprising a first foot deck portion to substantially support a first foot of a rider, and a second foot deck portion to substantially support a second foot of the rider, the at least two foot deck portions being adapted to receive the wheel between the first foot deck portion and the second foot deck portion along a board axis, the drive shaft secured at both ends by bushing means coupled to the at least two foot deck portions;
   a gyroscopic sensor coupled to the at least two foot deck portions;
   a control unit, adapted to read data from the gyroscopic sensor and selectively control the supply of power to the motor unit in order to maintain vertical alignment between the centers-of-gravity of the at least two foot deck portions and rider; and
   at least one suspension interface between the at least two foot deck portions and the wheel assembly, and having a single degree of freedom generally orthogonal to the at least two foot deck portions.

2. A self-balancing board of claim 1, wherein each of the at least one suspension interface comprises a spring.

3. A self-balancing board of claim 2, wherein the spring comprises a helical coil.

4. A self-balancing board according to claim 1, wherein the wheel assembly further comprises an axle extending through the motor unit that is received in elongated slots coupled to the at least two foot deck portions, the elongated slots being orthogonal to the at least two foot deck portions.

5. A self-balancing board according to claim 4, wherein a feature of at least one of the wheel assembly and the at least one suspension interface prevents fore-aft tilting of the wheel assembly relative to the at least two foot deck portions.

6. A self-balancing board according to claim 5, wherein the feature comprises at least one drive slider secured to the wheel assembly that is dimensioned to be snugly received and restricted from rotating within at least one of the elongated slots.

7. A self-balancing board according to claim 5, wherein the feature comprises cross-sections of the axle that are dimensioned to be snugly received and restricted from rotating within the elongated slots.

8. A self-balancing board according to claim 4, wherein the elongated slots have a fixed width therebetween.

9. A self-balancing board, comprising:
   at least two foot deck portions comprising a first foot deck portion to substantially support a first foot of a rider, and a second foot deck portion to substantially support a second foot of the rider;
   a wheel assembly positioned between the first foot deck portion and the second foot deck portion along a platform axis, the wheel assembly comprising:
      a wheel having a rotation axis; and
      a motor unit driving the wheel;
   an orientation sensor sensing the orientation of the at least two foot deck portions;
   a controller receiving data from the orientation sensor and controlling the motor unit in response to the received data; and
   at least one suspension interface between the at least two foot deck portions and the wheel assembly and having a single degree of freedom generally orthogonal to the at least two foot deck portions, and biasing the at least two foot deck portions towards a rest position.

10. A self-balancing board according to claim 9, wherein each of the at least one suspension interface comprises a spring.

11. A self-balancing board according to claim 10, wherein the spring comprises a helical coil.

12. A self-balancing board according to claim 9, wherein each of the at least one suspension interface further comprises a damper.

13. A self-balancing board according to claim 9, wherein the wheel assembly further comprises an axle extending through the motor unit that is received in elongated slots coupled to the at least two foot deck portions, the elongated slots being generally orthogonal to the at least two foot deck portions.

14. A self-balancing board according to claim 13, wherein a feature of at least one of the wheel assembly and the at least one of the elongated slots prevent fore-aft tilting of the wheel assembly relative to the at least two foot deck portions.

15. A self-balancing board according to claim 14, wherein the feature comprises drive sliders secured to the wheel assembly that are dimensioned to be snugly received and restricted from rotating within the elongated slots.

16. A self-balancing board according to claim 14, wherein the feature comprises cross-sections of the axle that are dimensioned to be snugly received within the elongated slots, at least one of the cross-sections being dimensioned to restrict rotation within the elongated slots.

17. A self-balancing board according to claim 13, comprising at least two of the suspension interfaces, the elongated slots of the at least two suspension interfaces having a fixed width therebetween.

18. A self-balancing board, comprising:
   at least two foot deck portions comprising a first foot deck portion to substantially support a first foot of a rider, and a second foot deck portion to substantially support a second foot of the rider;
   a wheel assembly positioned between the first foot deck portion and the second foot deck portion along a platform axis of the at least two foot deck portions, the wheel assembly comprising:

a wheel having a rotation axis; and
a motor unit driving the wheel;
an orientation sensor sensing the orientation of the at least two foot deck portions;
a controller receiving data from the orientation sensor and controlling the motor unit in response to the received data; and
at least one suspension interface between the at least two foot deck portions and the wheel assembly and preventing tilting and lateral and longitudinal movement of the at least two foot deck portions relative to the wheel assembly, the at least one suspension interface biasing the at least two foot deck portions towards a rest position.

19. A self-balancing board according to claim 18, wherein the wheel assembly further comprises an axle extending through the motor unit that is received in elongated slots coupled to the at least two foot deck portions, the elongated slots being orthogonal to the at least two foot deck portions.

* * * * *